United States Patent
Guerfi et al.

(10) Patent No.: US 7,427,369 B2
(45) Date of Patent: Sep. 23, 2008

(54) GRAPHITE AND COBALT OXIDE-CONTAINING COMPOSITION AND DEVICE FOR APPLYING A COATING ON A SUPPORT

(75) Inventors: Abdelbast Guerfi, Brossard (CA); Fernand Brochu, Longueuil (CA); Monique Masse, Longueuil (CA); Karim Zaghib, Longueuil (CA)

(73) Assignee: Hydro-Quebec, Montreal (CA)

( * ) Notice: Subject to any disclaimer, the term of this patent is extended or adjusted under 35 U.S.C. 154(b) by 0 days.

(21) Appl. No.: 11/689,364

(22) Filed: Mar. 21, 2007

(65) Prior Publication Data

US 2007/0160767 A1    Jul. 12, 2007

Related U.S. Application Data

(63) Continuation of application No. 10/311,535, filed as application No. PCT/CA01/00897 on Jun. 15, 2001, now abandoned.

(30) Foreign Application Priority Data

Jun. 15, 2000    (CA)    ................................... 2312213

(51) Int. Cl.
*H01B 1/20*    (2006.01)
*H01B 1/24*    (2006.01)

(52) U.S. Cl. ..................... 252/510; 252/511; 252/521.2

(58) Field of Classification Search ................. 252/510, 252/511, 521.2
See application file for complete search history.

(56) References Cited

U.S. PATENT DOCUMENTS

| | | |
|---|---|---|
| 4,064,074 A | 12/1977 | Ellis |
| 5,863,685 A | 1/1999 | DeFeo et al. |
| 5,910,532 A | 6/1999 | Schmidt et al. |

FOREIGN PATENT DOCUMENTS

| | | |
|---|---|---|
| JP | 07 320750 | 12/1995 |
| JP | 09 231961 | 9/1997 |
| JP | 11-273680 | 10/1999 |
| JP | 11-283612 | 10/1999 |
| JP | 11-283626 | 10/1999 |
| WO | 99 44245 | 9/1999 |
| WO | 99 44247 | 9/1999 |

*Primary Examiner*—Mark Kopec
(74) *Attorney, Agent, or Firm*—Oblon, Spivak, McClelland, Maier & Neustadt, P.C.

(57) ABSTRACT

A composition for applying a coating on a support at low temperature from a dispersion of at least a component of the coating to be deposited in the composition. The composition includes at least a strong and heavy solvent with a boiling point higher than 150° C. approximately, and a weak solvent with a boiling point less than 100° C. approximately. The solvents forming the composition must constitute a mixture that evaporates at a temperature less than 100° C. The composition is particularly useful for forming electrodes or electrolyte in lithium-ion batteries. The method and the device used for forming the coating use a dispersion spreader and an infrared lamp.

10 Claims, 2 Drawing Sheets

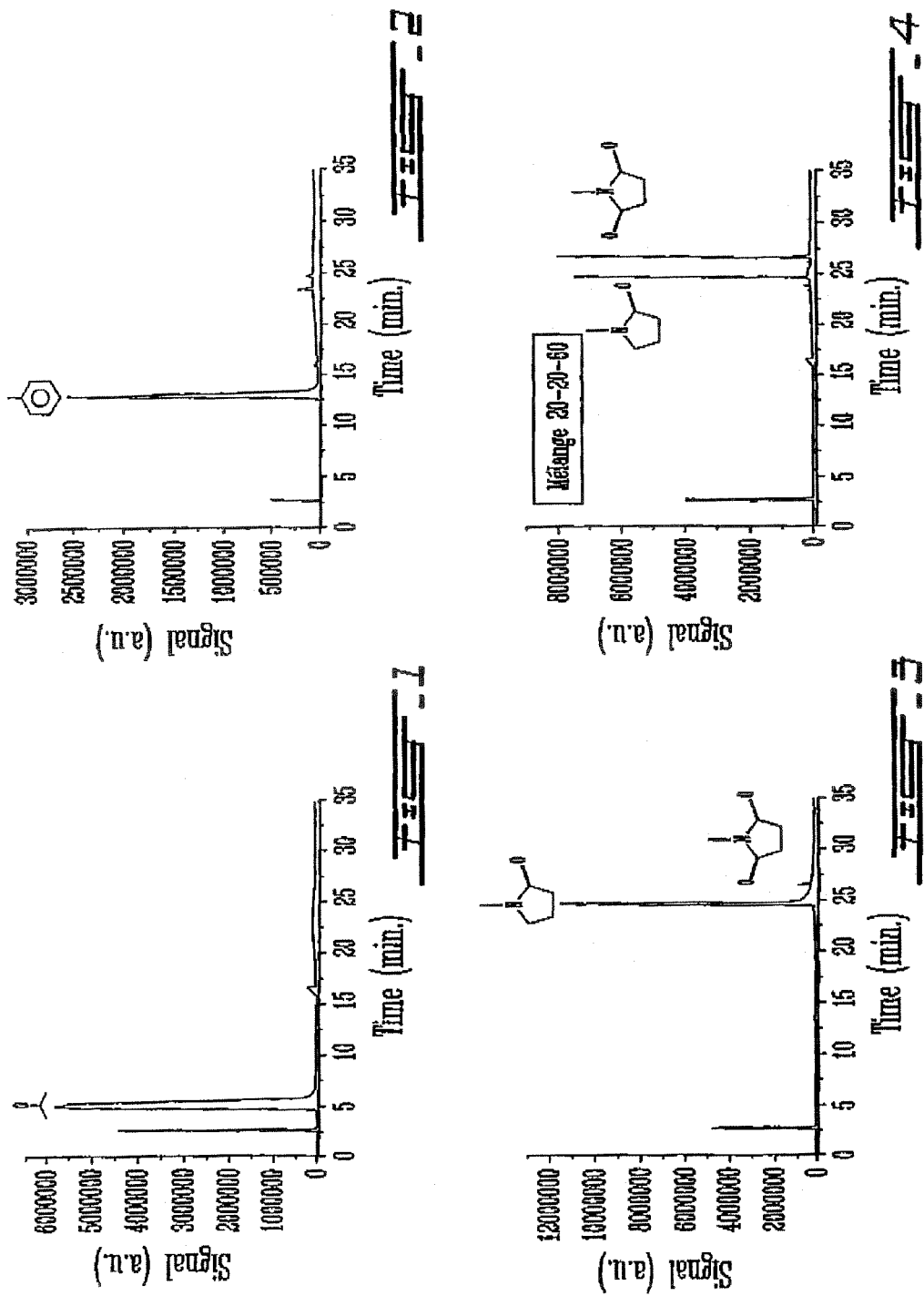

GRAPHITE AND COBALT OXIDE-CONTAINING COMPOSITION AND DEVICE FOR APPLYING A COATING ON A SUPPORT

This application is a CON of Ser. No. 10/311,535 (filed Jun. 25, 2003, now ABN), which application is a National Stage of PCT/CA01/00897 (filed Jun. 15, 2001), which in turn claims priority to Canadian Application No. 2312213 (filed Jun. 15, 2000), the entire contents of which are hereby incorporated by reference.

FIELD OF THE INVENTION

The present invention concerns a composition which can be used to apply, at low temperature, a coating on a support. The invention also concerns a method and a device that use the composition according to the invention to obtain said coating on a support. More particularly, the invention concerns the provision of a method for manufacturing electrodes or an electrolyte for lithium-ion type batteries, in which there is used a mixture of solvents which can disperse the components used for the prouction of the electrodes or electrolyte, said mixture being characterized in that it can be evaporated at slightly elevated temperature, for example by using infrared. The present invention also concerns the development of a composition constituting said mixture, as well as a spreading device insuring the application and the drying of a coating on a support film used for example in the production of electrodes or electrolyte in a lithium-ion type battery.

PRIOR ART

During the preparation of electrodes or an electrolyte for lithium-ion batteries, it is known that the components constituting the electrodes or an electrolyte may be incorporated in a solvent, such as N-methyl pyrolidone, herein after referred to as NMP. For more details, reference will be made to the Japanese applications published under numbers 11-283612, 11-283626 and 11-273680 respectively on Oct. 8, 1999, Oct. 15, 1999 and Oct. 15, 1999. NMP is considered as a strong and heavy solvent, i.e. it has an elevated boiling point, more specifically 202° C. Because of the elevated boiling point of the solvent used in the preparation of the solution which will be deposited on a support, drying of the electrodes or the electrolyte will require elevated temperatures in order to evaporate the strong and heavy solvent and thus deposit the components of the electrodes or the electrolyte on a support, for example a metallic or plastic sheet. Drying may also be carried out by heating under vacuum in order to increase the vapour pressure of the solvent. In this latter case, there is an increase in the cost for the preparation of the electrodes. Drying time and temperature are two critical aspects to ensure the control of the spreading of the electrodes as well as their porosity and there is thus an urgent need to decrease the production cost of the electrodes and of the electrolyte by improving the time and drying temperature factors.

SUMMARY OF THE INVENTION

It is therefore an object of the invention to provide a solvent composition ensuring a good dispersion of the components used during the application of a coating on a support, such as during the preparation of the electrodes or the electrolyte used in a lithium-ion type battery.

It is also an object of the invention to develop a dispersion of the components of the electrodes or the electrolyte for a lithium-ion type battery in which the evaporation temperature is only slightly elevated.

It is also an object of the invention to provide a method and a device for the provision of a coating on a support, by using the composition of solvents according the invention in the form of dispersion of the components of the coating.

It is also an object of the invention to provide a solvent or a mixture of solvents which may simultaneously solubilize the binder used in the composition of the electrodes and which has an evaporation temperature only slightly elevated.

Another object of the invention resides in the improvement of the interface thereby giving a good adhesiveness between the coating and the support because of the absence of bubbles at the interface.

Another object of the invention resides in the production of a coating on a support in which the adhesiveness on the support is such that the coating cannot practically be peeled away.

The invention concerns a composition permitting the application of a coating on a support at low temperature from a dispersion in the composition, of at least one component to be deposited on the support, the composition comprising at least one strong and heavy solvent in which the boiling temperature is higher than about 150° C., and a weak solvent in which the temperature is lower than about 100° C., the strong and heavy solvent and the weak solvent constituting a mixture which evaporates at a temperature lower than about 100° C.

The composition may also comprise a diluting agent in which the boiling temperature is lower than about 80° C., the latter having the property of increasing the capacity of solubilization of the mixture and of facilitating the evaporation of the strong solvent at low temperature.

According to a preferred embodiment of the invention, the mixture may evaporate under infrared to leave only the component constituting the coating on the support.

The strong and heavy solvent is preferably selected from N-methyl pyrolidone and cyclopentanone, the weak solvent is preferably selected from acetone or ethyl acetate, while the diluting agent is preferably selected from toluene or benzene.

According to another preferred embodiment, in volume ratio, the mixture comprises less than 20% strong solvent, between 40% and 60% weak solvent and between 15% and 25% diluting agent and the component is present in the dispersion at the rate of 0.015 g/cc to 0.04 g/cc of the mixture. The percent volume ratio of weak solvent:diluting agent is preferably between 80/20 and 65/25.

According to another preferred embodiment, the composition according to the invention may also comprise a binder of the component, such as fluorinated polyvinylidene.

The invention also concerns a dispersion in the composition according to the invention, of the component to be deposited on a support, said component possibly comprising a graphite powder, and the weight ratio between the graphite powder and the composition according to the invention may vary between 60:10 and 90:10. The component may also comprise cobalt oxide.

The invention also concerns a method for applying a coating on a support characterized by the following steps:

(a) there is provided a composition comprising at least one strong and heavy solvent in which the boiling temperature is higher than about 150° C., and a weak solvent in which the boiling temperature is lower than about 100° C., the strong solvent and the weak solvent being present in ratios adapted to constitute a mixture which can be evaporated at a temperature lower 100° C.;

(b) a component to be applied in the form of a coating on said support is dispersed in said mixture;

(c) the dispersion obtained in (b) is spreaded on said support;

(d) the dispersion is dried to obtain said coating.

Preferably, a dispersion is dried at a temperature lower than 100° C., such as by means of a heating element, for example an infrared lamp, with or without the addition of another heating element. When the support consists of a cross-linkable polymer, ultraviolet heating may also be added to cross-link said polymer. In step (a), a binder of the component may also be added in said composition.

According to another preferred embodiment of the invention, the binder is first solubilized in the strong and heavy solvent, the weak solvent is thereafter mixed with a diluting agent, and the whole composition is then mixed.

According to another embodiment of the invention, the support is an electrode or an electrolyte in the form of a film for rechargeable electrochemical generator.

The invention also concerns a device permitting the application of the coating on a support in the form of film comprising:

a source of support film;

a feeding tank adapted to contain a dispersion according to the invention;

an unwinding means enabling to circulate the support film in the vicinity of the feeding tank;

means to continuously pour a predetermined quantity of dispersion on the support film while the latter is in the vicinity of the feeding tank;

receiving means, and unwinding means continuously sending the support film and its coating to the receiving means;

motor means adapted to operate the unwinding means, the receiving means and the winding means; and a heating device enabling to evaporate the content of the dispersion at a temperature lower than 100° C. leaving a solid coating of the support film.

The heating device preferably comprises an infrared lamp.

In the case where the support film consists of a cross-linkable polymer, the heating device may also comprise at least one ultraviolet lamp capable of cross-linking the cross-linkable polymer if the latter contains a small percentage, for example less than 1% of photo-initiator. If the cross-linkable polymer contains a small percentage, for example less than 1% of a thermo-initiator, cross-linking may be carried out by means of the infrared lamp or a heating element.

According to another embodiment, the feeding tank includes means enabling to adjust the width as well as the thickness of a deposit of the dispersion on the support film according to the predetermined parameters.

BRIEF DESCRIPTION OF THE DRAWINGS

In the drawing which illustrate the invention,

FIG. 1 is a spectrum of acetone obtained by mass analysis;

FIG. 2 is a similar spectrum for toluene;

FIG. 3 is also a similar spectrum for N-methyl pyrolidone;

FIG. 4 is a spectrum corresponding to a mixture 20-20-60 of toluene, N-methylpyolidone and acetone.

DETAILED DESCRIPTION OF THE INVENTION

Figure 5:
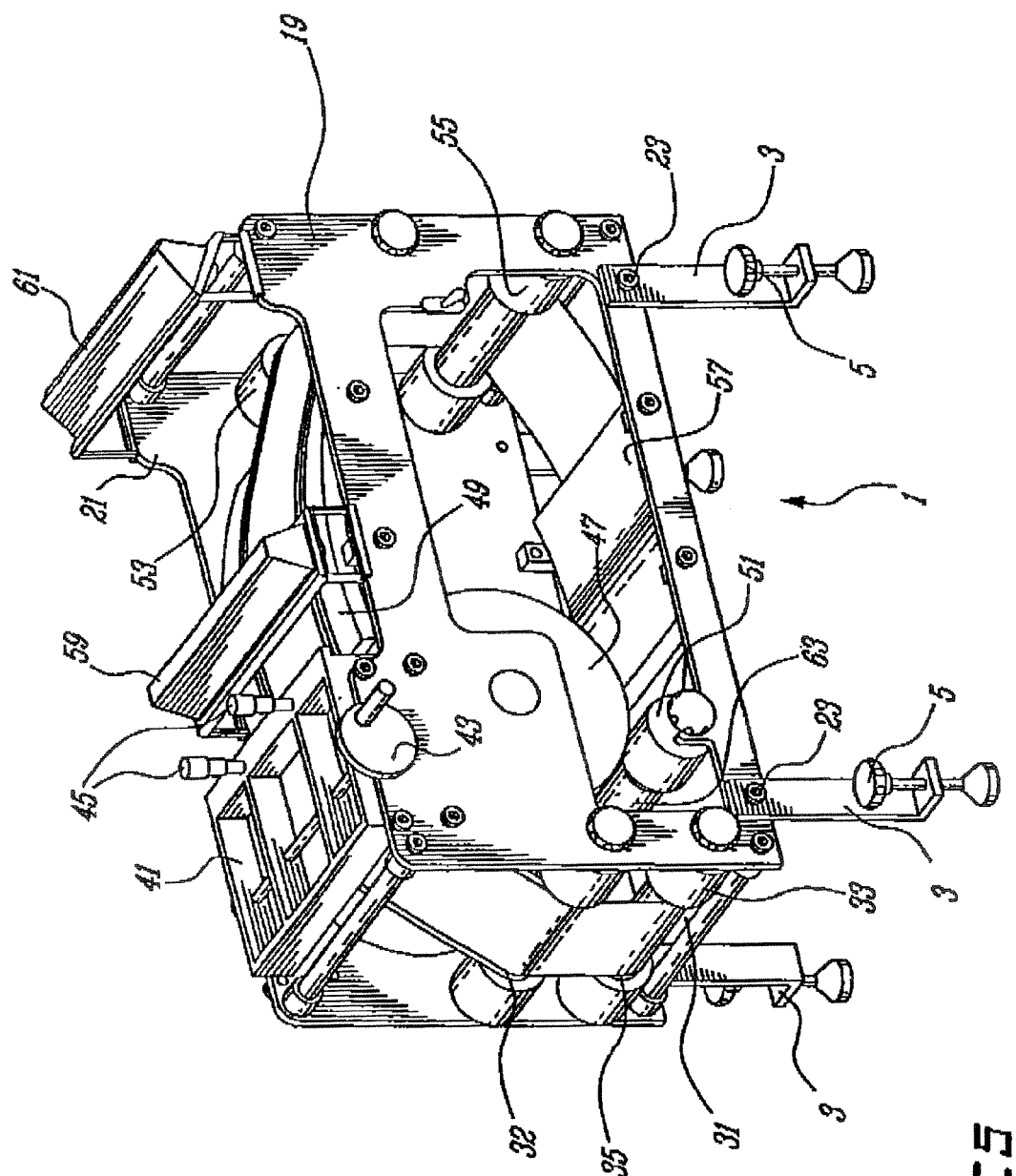
FIG. 5 is a perspective view of a device used to deposit a coating on a support using the composition according to the invention.

According to a preferred embodiment, a ternary mixture of solvent was obtained. A weak solvent as well as a diluting agent is added to the strong solvent. The weak solvent has an evaporation temperature of about 65° C., such as acetone. The latter has the property of carrying the strong solvent during evaporation at a temperatures lower than the one of the strong solvent. The diluting agent is a solvent which on the one hand increases the solubility of the binding agent and on the other hand the tendency to cause evaporation of the strong solvent. Drying of the electrode or the electrolyte is carried out by means of infrared lamps directly on the spreading line.

The binder is solubilized in the strong solvent normally at its maximum concentration (mixture A). A mixture (B) of weak solvent and diluting agent is prepared. The mixture (B) is added to mixture (A) to constitute the spreading solvent (C). The percentage of each solvent in the mixture depends on the performances of the new mixture on the one hand and the solubilization characteristics of the strong solvent on the other hand. In a triangle where the strong solvent does not exceed 20%, the weak solvent may vary between 40% and 50% and the diluting agent may vary between 15% and 25% in a ratio binding agent mixture (C) which may vary between 0.015 g/cc to 0.04 g/cc.

Analyses of individual solvents were carried out with a space sampler system HP7694 (Agilent Technologie) coupled to a gaseous phase chromatography device GC6890 (also of Agilent) for the injection and the separation of the species. Detection was carried out by means of a mass spectrometer HP5973 (also from Agilent) by using the "total ions" analysis method. Separation of the compounds was carried out on a polar column Stabilwax® 60 m×0.25 mmID having a film thickness of 0.25 μm (Restek).

A mixture in which the volume ratios are 20% NMP, 60% acetone and 20% toluene was prepared. The evaporation temperatures of these solvents are 202° C. (NMP), 56° C. (acetone) and 110° C. (toluene). This mixture was heated to 80° C. during 12 h. All the liquid was evaporated and a polymer type residue was obtained.

A mass analysis spectrum by GC has shown a new phase (FIG. 4) that is different from the spectra of solvents individually tested: acetone (FIG. 1), toluene (FIG. 2) and NMP (FIG. 3). By comparison, after 1 h at 80° C., there is a complete evaporation of acetone, 22% for toluene while no evaporation was noted for NMP.

Drying of the electrode was carried out by means of a new method which uses an infrared lamp. This method was completed in order to increase drying efficiency. This new method makes it possible to evaporate the solvent in a shorter time.

FIG. 5 illustrates a prototype of a machine prepared in a laboratory with which the examples of this patent have been carried out.

With reference to FIG. 5, it will be seen that the device according to the preferred embodiment of the invention comprises a frame 1, mounted on four feet 3, adjustable at 11, and designed to dispose therein the parts constituting the device. The device itself includes two longitudinal risers 19, 21 arranged in a parallel fashion and mounted at 23 on feet 3.

The device also comprises a source of support film in the form of a winding 31 of support film mounted on a roller 33. As seen in the illustration of FIG. 5, roller 33 is mounted in known manner between the two risers 19, 21 at a lower end of the latter and in free rotation to make it possible to freely unwind the support film 35 as it will be seen later. Located in a same vertical plane as the winding 31, there is a roller support 37 also mounted in known fashion between the two risers 19, 21 and in free rotation.

At the top of the device, there is a feeding tank 41 of conventional structure and provided with a non illustrated spreading system, permitting to continuously pour predetermined quantities of the dispersion as mentioned above and which will be used to produce a coating for electrodes or electrolytes on the support film 35. Il will be noted that the feeding tank 41 includes two control stations, one 43 intended to produce a deposit of a dispersion of predetermined width, and the other 45, making it possible to pour a quantity of dispersion with a predetermined coating thickness. The feeding tank 41 is mounted in known manner between the two risers 19, 21 as it can be seen on the illustration of FIG. 5.

Under the feeding tank 41, there is a roller support 47 of large diameter and on which the support film 35 will rest during its passage between the feeding tank and the roller support 47. Upstream of the feeding tank and mounted in a known fashion, in the upper part of the risers 19, 21, there is provided a rest support 49 slightly curved, all in a manner to facilitate the sliding of the coated support film towards the winding coil 51 that will be described more in detail hereinafter.

At the opposite end of the device, two freely rotatable rollers 53, 55 that are used as a rest for the film support during return of the latter towards the winding coil 51, are mounted in known manner between the two risers 19, 21. The device also includes a rest support 67, placed below support 49 and under which the coated support film will finally be lead towards the winding coil 51.

With respect to the latter, it is mounted in known manner in the lower part of the device, between the two risers 19, 21 in the vicinity of roller rest 47. A motorized means, not illustrated, disposed in roller rest 47, operates the winding coil 51, when the latter is frictionally engaged with roller support 47. In this manner, once the end of the support film 35 is fixed to the winding coil 51, it will be sufficient to operate the device to achieve continuous unwinding of the film.

To complete the device, it is nearly sufficient to provide an ultraviolet lamp 59 and an infrared lamp 61. Ultraviolet lamp 59 is placed above the film support 35 at the outlet of the feeding tank and above rest support 49. With respect to the infrared lamp 51, it is found at the end of the device opposite feeding tank 41 and it is oriented to project its beam towards the upstream end of the rest support 49.

Operation of the device is carried out as follows. The end of a film support 35 mounted on the winding coil 31 is grabbed, the support film is unwinded by bypassing the rest roller 37, it is then allowed to slid between feeding tank 41 and rest roller 37. The support film then bypasses the rest support 49, rollers 53, 55, rest support 57 to finally be fixed to winding coil 51 by making sure that the rest roller 47 is frictionally engaged at 63 with winding coil 51 to carry the latter. The motor is operated, the infrared lamp 61 is turned on and possibly also ultraviolet lamp 59, and pouring of the dispersion on the support film 35 is initiated after having adjusted the width and the flow rate.

This machine can also be adapted for different types of spreading: anode, cathode and electrolyte of different sizes, shapes and distributions of particle. It makes it possible to use different mode of drying such as, for example, with infrared, heating element or a combination of the two modes. It is also provided with a system of ultraviolet lamp (UV) for cross-linking the electrolytes. In the case of thermal cross-linking, the heating element may also act as cross-linker. The combination of the source UV and of the heating element can easily be adapted to this type of operation.

An advantage of the device according to the invention is to being able to obtain coating film with minimum quantities of active material, about 1 g, which is an advantage when used at the laboratory scale.

The use of solvent mixtures to spread the film, on one hand decreases the drying temperature and increases the spreading speed. On the other hand, it also reduces the drying zone.

The invention will now be illustrated by mean of the following non limiting examples.

EXAMPLES

Example 1

The PVDF binder fluorinated polyvinylidene is solubilized in NMP N-methyl pyrolidone. A mixture of solvents acetone/toluene at 80/20 is added to the PVDF-NMP paste to constitute the spreading composition. Graphite powder is dispersed in the spreading composition in a weight ration of 90/10. This mixture is applied on a copper collector by the Doctor Blade™ method. The electrode is dried with an infrared lamp at 80° C.

The electrode is mounted on a disc battery of the type 2035. A Celgard™ 2300 separator soaked with an electrolyte 1M LiPF6+EC/DMC:50/50 (ethylene carbonate+dimethycarbonate) is used.

Electrochemical tests were carried out at room temperature. Discharge-charge curves were obtained between 0V and 2.5V at C/24. The coulomb efficiency of the first cycle is 88%. This result is comparable to the one obtained with electrodes prepared with the composite (graphite-PVDF-NMP) with drying at 140° C. under vacuum.

Example 2

In the same spreading composition as the one used in example 1, carbon black is first dispersed, following a dispersion of cobalt oxide in a weight ratio: oxide/carbon black/PVDF of 80/10/10. This mixture is applied on an aluminum collector by the Doctor Blade™ method. At the same time, the electrode is dried with an infrared lamp at 80° C. The electrode is mounted in a disc battery of type 2035. A Celgard™ separator 2300 soaked with the electrolyte 1M LiPF6+EC/DMC: 50/50 (ethylene carbonate+dimethylcarbonate) was used.

Electrochemical tests were carried out at room temperature. Discharge-charge curves were obtained between 2.5V and 4.2V at C/24.

It is understood that the invention covers any modification obvious to one skilled in the art provided that it is within the scope of the following claims.

The invention claimed is:

1. Dispersion of a component comprising a graphite powder and cobalt oxide in a composition, said component to be deposited as a coating on a support, said composition comprising at least one strong and heavy solvent having a boiling temperature higher than about 150° C. and a weak solvent having a boiling temperature lower than about 100° C., the strong and heavy solvent and the weak solvent comprising a mixture which evaporates at a temperature lower that about 100° C.

2. A dispersion according to claim 1, wherein said mixture further comprises a diluting agent having a boiling temperature lower than about 80° C., said diluting agent having the property of increasing the solubilization capacity of the mixture and of facilitating an evaporation of the strong solvent at low temperature.

3. A dispersion according to claim 2, characterized in that the mixture comprises less than 20% strong solvent, between 40% and 60% of weak solvent and between 15% and 25% diluting agent.

4. A dispersion according to claim 2, wherein a volume ratio of weak solvent/diluting agent is between 80/20 and 65/25.

5. A dispersion according to claim 1, wherein said mixture may evaporate under infrared to leave only said component constituting said coating on the support.

6. A dispersion according to claim 1, wherein the strong and heavy solvent is selected from N-methyl pyrolidone and cyclopentanone.

7. A dispersion according to claim 1, wherein the weak solvent is selected from acetone or ethyl acetate.

8. A dispersion according to claim 1, wherein the component is present in the dispersion at the rate of 0.015 g/cc to 0.04 g/cc of the mixture.

9. A dispersion according to claim 1, also comprising a binder for said component.

10. A dispersion according to claim 9, wherein the binder comprises fluorinated polyvinylidene.

* * * * *